Nov. 4, 1952     P. F. MORGAN ET AL     2,616,565
APPARATUS FOR TREATING SEWAGE
Filed Nov. 22, 1946     3 Sheets-Sheet 1

INVENTORS.
Philip F. Morgan
John A. Tapleskay
& Paul M. Thayer,
By Schneider & Dressler Attys.

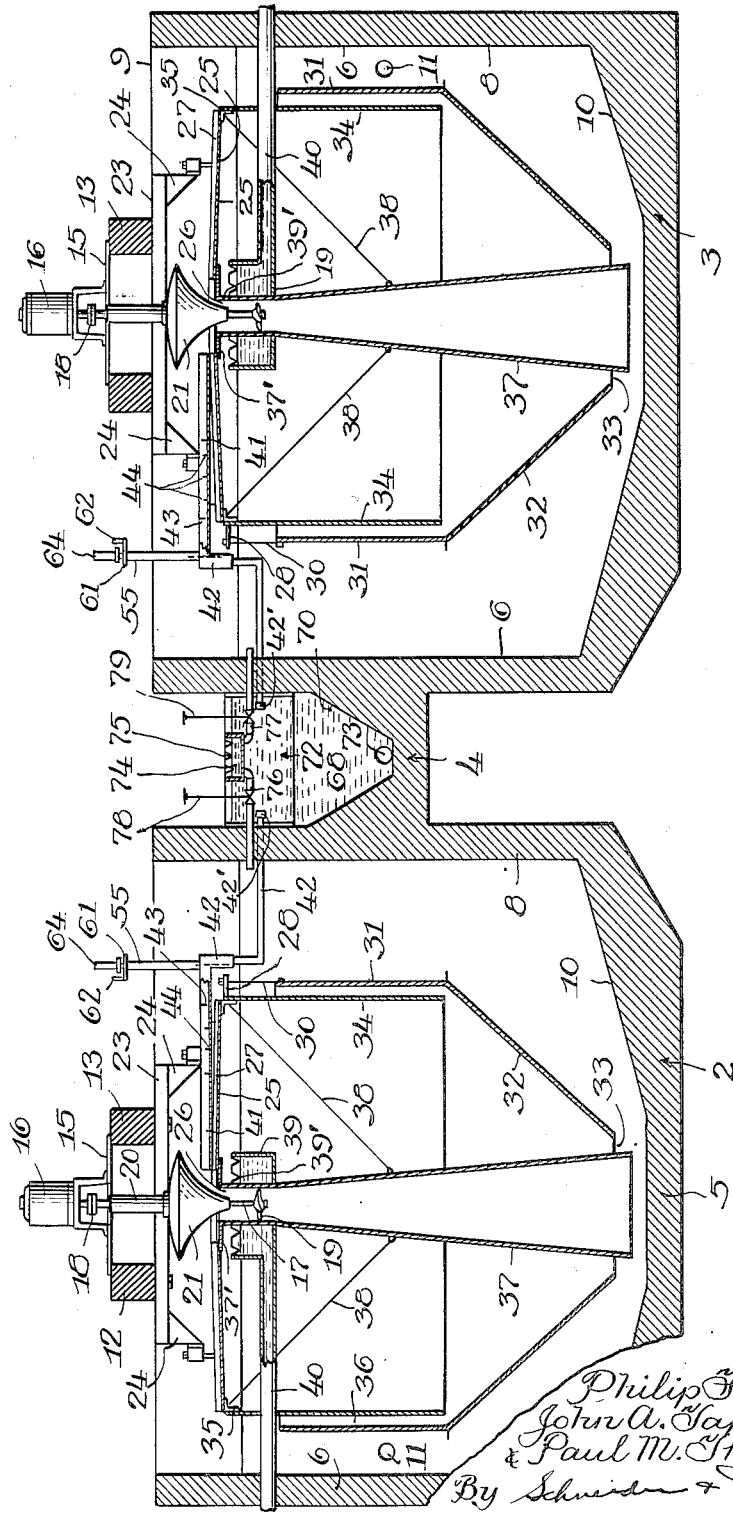

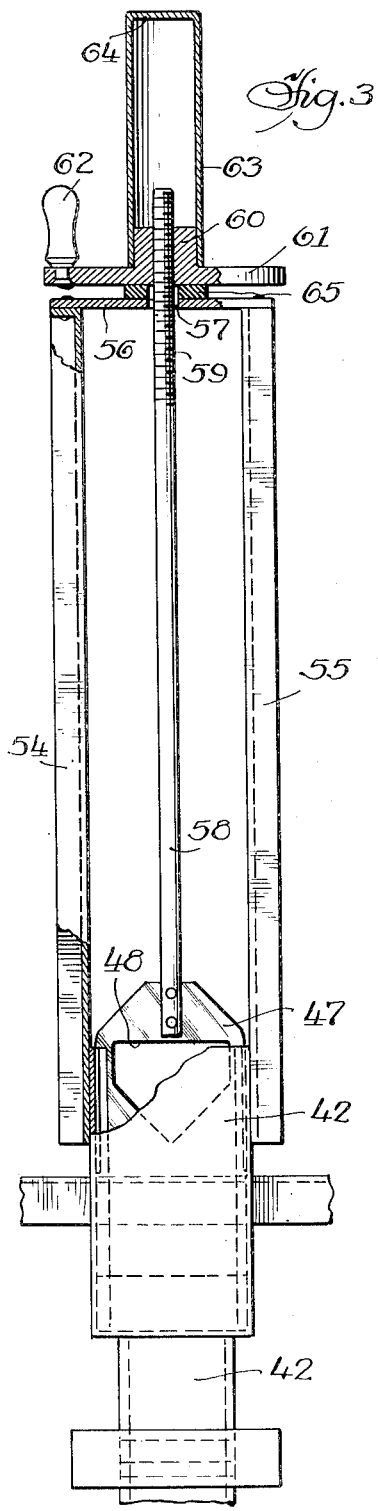
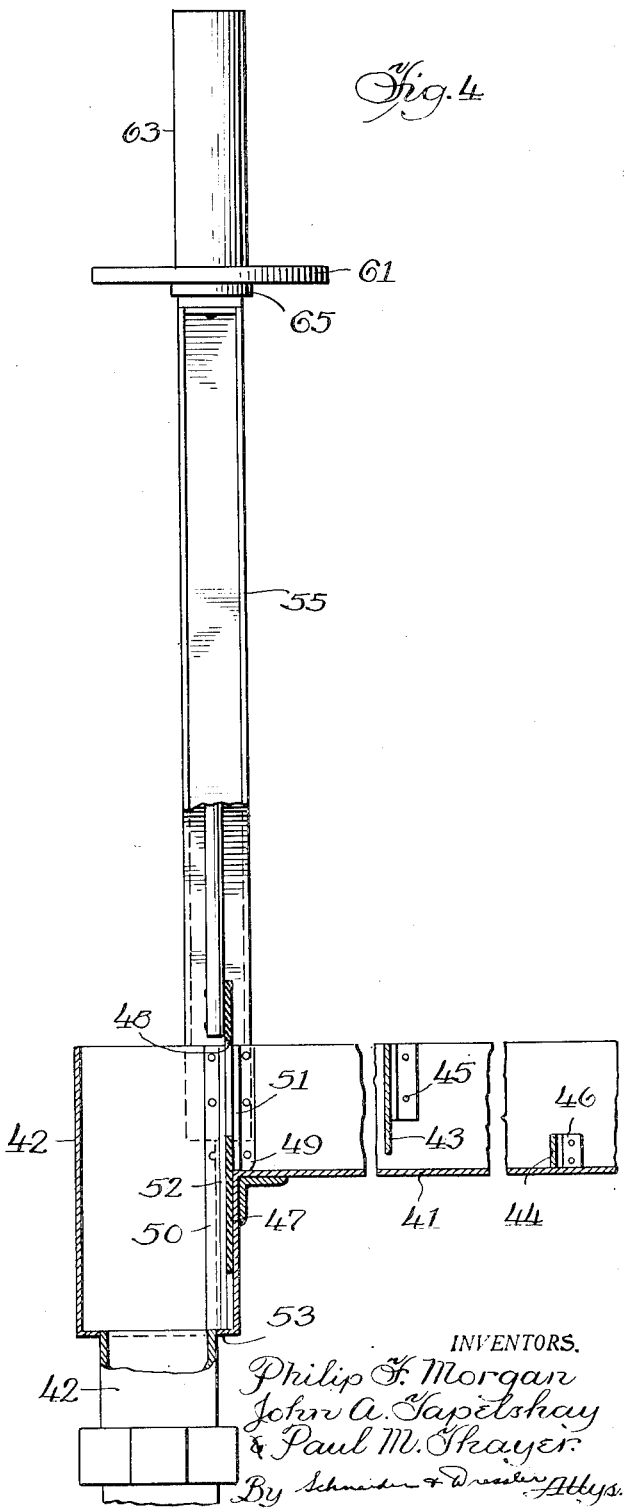

Patented Nov. 4, 1952

2,616,565

UNITED STATES PATENT OFFICE 2,616,565

APPARATUS FOR TREATING SEWAGE

Philip F. Morgan, Kalamazoo, Mich., John A. Tapleshay, Chicago, Ill., and Paul M. Thayer, Milwaukee, Wis., assignors to Chicago Pump Company, a corporation of Delaware Application November 22, 1946, Serial No. 711,700

6 Claims. (Cl. 210—8)

This invention relates to apparatus for treating sewage by the activated sludge method, and particularly to an apparatus having a single waste sludge tank associated with a plurality of aeration tanks.

In the activated sludge method of treating sewage, the sewage, from which the heavier solid bodies have settled in a primary tank and been removed, is caused to flow into an aeration tank where it comes into contact with the activated sludge and is mixed with air. As disclosed in the patent to Durdin, No. 2,285,697, in connection with the apparatus there shown and described, the sewage coming into the aeration tank is drawn upwardly through a draft tube and is diffused on to a splash plate and thereby aerated. The aerated sewage falls into a clarification tank and a portion of it passes through an opening into a waste sludge tank. Some of the sludge settles from the sewage in the waste sludge tank, and the excess sludge is drawn from the waste sludge tank to a digester. The clearer supernatant liquid, which contains some activated sludge, is drawn from the waste sludge tank to the draft tube to be mixed with the sewage being drawn upwardly through the draft tube from the aeration tank, and is again mixed with air.

Two disadvantages are inherent in the use of the type of apparatus hereinabove described. The first is the expense of construction and operation of the apparatus. Each aeration tank requires its own waste sludge tank, and mechanical equipment is required to pump the liquid from the waste sludge tank into the draft tube. The second disadvantage results from the fact that the pipe through which the liquid is pumped from the waste sludge tank to the draft tube is necessarily concealed in the sewage contained in the aeration tank, and the flow of sewage between the aeration tank and the waste sludge tank is difficult to control.

In accordance with the present invention gravity is relied on to cause the aerated sewage from the aeration tank which has been deflected into the trough which is positioned just above the aeration tank to flow from the trough to the waste sludge tank, and also to cause the liquid, from which part of the sludge has settled, to flow back into the aeration tank from the waste sludge tank. This arrangement eliminates the use of mechanical equipment for pumping the liquid from the waste sludge tank to the aeration tank, and consequently reduces the item of expense of maintenance for such equipment. Although mechanical equipment is used to draw the sewage from the aeration tank up through the draft tube to cause some of it to be deflected into the trough, the maintenance expense is not so great because it is used for only the one purpose instead of being used also to draw the liquid from the waste sludge tank back to the aeration tank. The construction expense of the apparatus constituting the present invention is also less than required by the apparatus of the prior art because a single waste sludge tank is used with a plurality of aeration tanks.

The aerated sewage flowing from the aeration tank to the waste sludge tank flows through an open trough extending above the top of the clarification tank in the apparatus of the present invention. The open trough construction permits visibility of the sewage at this stage of its treatment and facilitates control of the flow of sewage to the waste sludge tank.

The trough of the present construction is provided with means to quiet the turbulence of the sewage flowing to the waste sludge tank. The trough is also provided with adjustable means for limiting the amount of flow of sewage into the waste sludge tank, thereby making it easy to regulate the proportion of activated sludge in the aeration tank. This regulation is of prime importance in the activated sludge process because the process works more efficiently with a definite concentration of activated sludge in the aeration tank. The apparatus of the present invention provides an easy means for keeping the concentration of activated sludge in the aeration tank within the desired range regardless of the quantity of flow of the sewage into the aeration tank.

The structures by which the various results referred to above are attained will be described in connection with the accompanying drawings, in which:

Fig. 2 is a cross sectional view, partly diagrammatic, taken substantially along the line 2—2 of Fig. 1;

Fig. 3 is a front elevation of the adjustable weir for limiting the flow of aerated sewage from the aeration tank to the waste sludge tank; and Fig. 4 is a side elevation, with parts in section, of the adjustable weir and the associated passageways.

Figure 1:
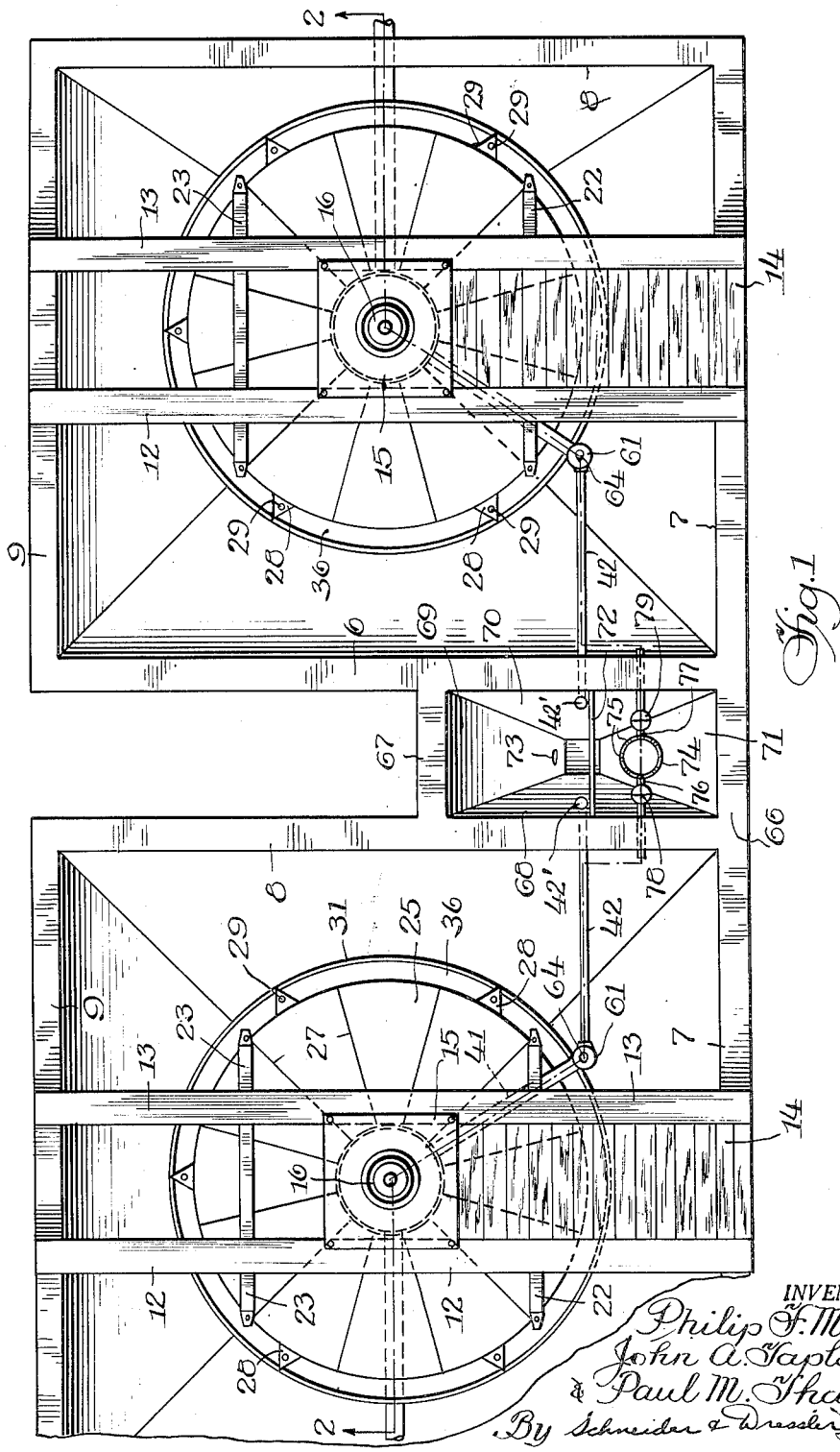
Figure 1 is a top plan view of an apparatus comprising two aeration tanks and a single waste sludge tank in conjunction therewith.

In the drawings, the reference numerals 2 and 3 indicate a pair of aeration tanks having a single waste sludge tank 4 connected to both of said aeration tanks. The aeration tanks are duplicates and therefore only one will be described. Although the apparatus is illustrated as comprising two aeration tanks and one waste sludge tank, it will be understood that the number of aeration tanks used with a single waste sludge tank may be increased to three or four or even more, as desired.

The aeration tank is provided with a bottom 5 and side walls 6, 7, 8 and 9. The bottom and side walls are preferably made of concrete, but they may be made of any suitable material. The exact shape of the tanks is not essential to the invention, but it is preferred to have the upper surface of the bottom 5 slope towards the center, as indicated at 10, so that the settled sewage in the tank will incline towards the center of the tank. The sewage flows into the aeration tank through any suitable inlet, as indicated at 11.

A pair of cross beams 12 and 13 extending across the aeration tank is supported on top of the walls 7 and 9. The space between the beams is covered with planks 14 to provide a cat-walk enabling workmen to reach various parts of the apparatus hereinafter described. A metal plate 15, disposed centrally over the tank, is secured to the beams 12 and 13. A motor 16 is mounted on the plate 15 and drives a shaft 17 through a suitable coupling 18. The shaft 17 depends through the plate 15 into the tank and has a propeller 19 mounted thereon adjacent its lower end. A sleeve 20, secured to the underside of the plate 15 encircles a portion of the shaft 17 and has a diffuser cone 21 secured to its lower portion. The lowermost portion of the diffuser cone is positioned above the propeller 19.

A pair of rods 22 and 23 extends transversely of the beams 12 and 13. Each of the rods is secured to each beam and projects beyond the edges thereof. Brackets 24 secured to each end of each of the rods 22 and 23 support a splash plate 25. The splash plate is provided with a centrally disposed aperture 26 through which the lower portion of the diffuser cone extends. The upper surface of the splash plate is provided with a plurality of radially extending ribs 27 which aid in churning the liquid as it flows over the splash plate to increase the amount of air that is mixed with the sewage.

A plurality of lugs 28 is circumferentially disposed around the outer edges of the splash plate 25. The lugs 28 are apertured, as indicated at 29, and wires 30 secured in the apertures support a circular metal shell 31 to which a conical shaped bottom 32 is secured. The shell 31 and the conical bottom 32 constitute a clarification tank which is suspended in the aeration tank. The central portion of the bottom 32 of shell 31 is apertured, as indicated at 33, and thereby establishes communication between the clarification tank and the aeration tank.

A circular shell 34, of smaller diameter than the shell 31, is supported concentrically of the shell 31 by an annular angle iron 35 secured to the underside of splash plate 25. The shell 34 extends downwardly in the aeration tank to about the same depth as the shell 31 and forms an inner wall for the upper half of the clarification tank so that liquid in the upper portion of the clarification tank, where it is normally quiescent, will not be disturbed by the sewage falling through the space 36 between the shells 31 and 34 into the clarification tank.

A draft tube 37 having a conical shape is supported centrally of the clarification tank, with the flare directed downwardly, by means of a plurality (preferably four or more) of guy wires 38, each of which has one end secured to the angle irons 35 and the other end to the draft tube. The lower end of the draft tube is open and extends below the bottom of the clarification tank. The upper end of the draft tube encloses the propeller 19 and extends upwardly to a point adjacent the lower portion of the diffuser cone. Preferably the upper end of the draft tube has a flange 37' which fits against the underside of the splash plate 25.

The propeller 19 is effective to draw sewage from the aeration tank up through the draft tube into contact with the diffuser cone, from which it splashes in all directions, thereby becoming aerated. The ribs 27 on the splash plate 25 cause the sewage to keep churning as it passes over the splash plate, thereby mixing it with still more air.

The splash plate covers the entire top of the clarification tank so that none of the aerated sewage can enter the clarification tank through the top of the shell 34. The greatest portion of the aerated sewage flows from the splash plate back into the aeration tank and is eventually drawn up the draft tube again to be again mixed with air. This continued circulation of the same sewage from the aeration tank through the draft tube to the splash plate and back to the aeration tank insures a maximum mixing of air with the sewage during the process. However, a portion of the aerated sewage does fall from the splash plate into the space 36 between the shells 31 and 34, thereby entering the clarification tank. The sludge in the sewage falling into the space 36 settles toward the bottom of the clarification tank and is again drawn up through the draft tube with the sewage from the aeration tank. As the sludge settles toward the open bottom of the clarification tank, substantially clear liquid rises to the top of the clarification tank.

A weir 39, having its top edge notched, as indicated at 39', is positioned around the upper portion of the draft tube. A pipe 40 leads from the weir 39 through the clarification tank and the aeration tank to an outfall. When the liquid level in the aeration tank reaches the level of the bottom of the notches 39' the clear liquid in the top of the clarification tank flows over the weir and through the pipe 40 to the outfall. The lower edges of the notches 39' establish the liquid level for both the aeration tank and the clarification tank since these tanks are in communication through opening 33 as pointed out above.

An open top trough 41 is mounted on the splash plate 25 with one end adjacent the diffuser cone 21 so that some of the sewage splashed from the diffuser cone will fall into the trough. The trough extends across the splash plate and terminates at a closed pipe 42 with which it is in communication, beyond the edge of the clarification tank. Pipe 42 extends downwardly and then horizontally through the aeration tank, passing therefrom through one wall into the waste sludge tank 4. A plurality of baffles 43 and 44 extend across the trough and are secured to the side walls, as indicated in Fig. 4 at 45 and 46, respectively. The baffle 43 extends across the trough 41 at its top, and the baffles 44 extend across the trough at its bottom. These baffles quiet the turbulence of the sewage flowing through the trough. Although Fig. 2 shows three baffles 44 and one baffle 43, it will be obvious that the number and arrangement of the baffles may be varied.

An adjustable weir 47, comprising a flat plate having an aperture 48, is slidably mounted in pipe 42 adjacent the end of trough 41. The sliding movement of the weir is kept in a vertical plane by angle irons 49 secured to the inside of the side walls of trough 41 and angle irons 50 secured in the upper portion of pipe 42. The projecting flanges 51 and 52 of the angle irons are spaced apart sufficiently to permit the weir to be moved vertically therebetween. The pipe 42 has an offset 53 to limit the downward movement of the weir.

A pair of vertical support members 54 and 55, secured at their lower ends to the end of the trough 41 and the pipe 42, are connected at their upper ends by a cross piece 56 which is provided with a centrally disposed aperture 57. A rod 58, secured at its lower end to the weir 47, projects through the aperture 57. The rod 58 is screw threaded on its upper portion, as indicated at 59. A nut 60 is threaded on the rod 58 and is fixed so that rotation of the nut raises and lowers the weir 47. The nut has a disk-like portion 61 to which a handle 62 is secured to facilitate its rotation. A cap 63 is fitted over the end of the nut to protect it from dust and dirt. The top 64 of the cap is closed, but is sufficiently high to permit the rod 58 to raise the weir as far as necessary. A loose washer 65 is mounted on the rod 58 between the cross piece 56 and the nut 60 so that the nut may be turned freely. As shown in Fig. 1, weir 47 and its associated structure are mounted near one of the cross beams 12 or 13 so that the handle 62, by means of which the weir is vertically moved, is accessible to a person on the cat-walk 14.

The amount of sewage passing through trough 41 is, of course, limited by the size of the trough. This sewage contains the same proportion of activated sludge as the sewage in the aeration tank. Since a proportion of the sludge settles from the sewage in the waste sludge tank, the liquid that is returned to the aeration tank from the waste sludge tank reduces the concentration of the activated sludge in the aeration tank. If the sludge concentration in the aeration tank is below the desired range for most efficient operation it is necessary to increase the concentration by reducing the amount of sewage flowing from the aeration tank to the waste sludge tank. This is readily accomplished by raising the weir 47. If too heavy a concentration of activated sludge is present in the aeration tank the weir 47 may be lowered to increase the flow of sewage through the trough 41 into the waste sludge tank, thereby decreasing the sludge concentration in the aeration tank.

The waste sludge tank 4 may be a separate structure, but we have illustrated it as being built between two aerating tanks and having one of its side walls in common with one wall 6 of one of the aeration tanks and its other side wall in common with the wall 8 of an adjacent aeration tank. The waste sludge tank is provided with a pair of end walls 66 and 67. The four walls of the waste sludge tank extend vertically for approximately the upper half of their height, and the lower portions of each of the walls slope toward each other, as indicated at 68, 69, 70 and 71 to form a hopper like bottom. The waste sludge tank 4 is divided transversely by a baffle 72 which is secured to the opposite side walls of the tank and extends from a point above the liquid level of the tank to a level substantially below the inlets 42' from the pipes 42, but does not extend to the bottom of the waste sludge tank.

Each inlet 42' is on the same side of the baffle so that all the sewage from trough 41 will enter the waste sludge tank on the same side of the baffle. The aerated sewage coming into the waste sludge tank has a certain sludge content and most of this sludge will settle to the bottom of the tank. The accumulated sludge is removed from the waste sludge tank through a waste sludge outlet 73.

The substantially clear supernatant liquid in the waste sludge tank passes under the baffle and rises on the side of the baffle away from the inlets 42'. This side of the waste sludge tank has a weir 74 mounted therein. The edge of the weir 74 is notched, as indicated at 75, to maintain a liquid level in the waste sludge tank that is higher than the liquid level in each of the aeration tanks in the system. The weir 74 has a plurality of outlets, here shown at 76 and 77, each leading to an aeration tank. Whenever the substantially clear liquid in the waste sludge tank rises above the bottom of the notches 75 it spills through said notches into the weir 74 and through the outlets 76 and 77. The baffle 72 prevents any of the sewage coming into the waste sludge tank through any of the inlets 42' from flowing directly to one of the outlets. Each outlet has a valve 78, 79 so that any desired aeration tank can be cut off from the system.

The clear liquid from the waste sludge tank will flow to the aeration tank by the force of gravity, since the liquid level of the waste sludge tank is higher than the liquid level of the aeration tank. The aerated sewage which is lifted from the aeration tank by the propeller 19 and deflected into the trough 41 by the diffuser cone 21 will flow into the waste sludge tank by gravity also, since the trough 41 is higher than the liquid level of the waste sludge tank.

Although we have described a preferred embodiment of the invention in considerable detail, it will be understood that the description is intended to be illustrative, rather than restrictive, as many details may be modified or changed without departing from the spirit or scope of the invention. Accordingly, we do not desire to be restricted to the exact structure described, except as limited by the appended claims.

We claim:

1. In an apparatus for treating sewage, a waste sludge tank, a plurality of aeration tanks, each of said aeration tanks having means for splashing sewage in all directions above the aeration tank to mix it with air, a trough positioned above said aeration tank in position to receive some of the sewage splashed above said tank, said troughs leading to said waste sludge tank, a weir in said waste sludge tank and in each of said aeration tanks for controlling the liquid level in each of said tanks, the edge of the weir in the waste sludge tank over which the liquid from the waste sludge tank overflows being positioned at a higher level than the similar edges of the weirs in the aeration tanks whereby the liquid level in said waste sludge tank is maintained at a level higher than the liquid level of any of the aeration tanks from which it is fed, outlet pipes leading from said waste sludge tank to each of said aeration tanks, said outlet pipes being in communication with the outlet from the weir in said waste sludge tank whereby the higher level in said waste sludge tank causes liquid to flow from said waste sludge tank to each of said aeration tanks.

2. In an apparatus for treating sewage, a waste sludge tank, a plurality of aeration tanks, each of said aeration tanks being provided with means for splashing sewage in all directions above the aeration tank to mix it with air, separate open top troughs above the liquid level in said aeration tanks, said troughs being in position to receive some of the sewage splashed above said tank and leading from each of said aeration tanks to said waste sludge tank, baffles in each of said troughs to still the turbulence of aerated sewage flowing from said aeration tanks to said waste sludge tank, and an adjustable weir in each of said troughs to limit the amount of aerated sewage flowing through said troughs.

3. In an apparatus for treating sewage, an aeration tank, a draft tube in said tank, means for drawing sewage from said aeration tank upwardly through said draft tube, a diffuser cone adjacent the top of said draft tube, said diffuser cone causing the sewage passing through said draft tube to be splashed in all directions to become aerated, a clarification tank in said aeration tank, a waste sludge tank, an open top trough positioned above said clarification tank and communicating with said waste sludge tank, said trough sloping towards said waste sludge tank, portions of said aerated sewage being deflected by said diffuser cone into said clarification tank and into said trough, a weir in said waste sludge tank and in said aeration tank for controlling the liquid level in each of said tanks, the edge of the weir in the waste sludge tank over which the liquid from the waste sludge tank overflows being positioned at a higher level than the similar edge of the weir in the aeration tank, whereby the liquid level in said waste sludge tank is maintained at a level higher than the liquid level of the aeration tank from which it is fed, an outlet pipe in communication with the outlet from said weir leading from said waste sludge tank to said aeration tank, whereby the higher level in said waste sludge tank causes liquid to flow from said waste sludge tank to said aeration tank.

4. In an apparatus for treating sewage, an aeration tank including means for mixing air with said sewage, a waste sludge tank, a pipe connecting said aeration tank and said waste sludge tank, a weir positioned in said waste sludge tank for maintaining liquid therein at a higher level than the level of liquid in said aeration tank, said pipe being in communication with the outlet from said weir whereby liquid flows through said pipe from said waste sludge tank to said aeration tank, and an open top trough positioned above said aeration tank in position to receive a portion of said sewage from said aeration tank as it is mixed with air for conveyance to said waste sludge tank, said trough sloping towards said waste sludge tank whereby the sewage passes through said trough by gravity.

5. In an apparatus for treating sewage, an aeration tank including means for splashing sewage above the tank in all directions to aerate it, a waste sludge tank having a weir positioned therein for maintaining a higher liquid level therein than the liquid level in said aeration tank, a pipe connecting said waste sludge tank to said aeration tank, said pipe being in communication with the outlet from said weir whereby liquid flows by gravity from said waste sludge tank to said aeration tank, a trough positioned above said aeration tank in position to receive a portion of the aerated sewage splashed above said aeration tank and to carry it by gravity to said waste sludge tank, means in said trough to still the turbulence of said sewage passing therethrough, an adjustable weir in said trough for limiting the amount of sewage passing through said trough, and a baffle extending substantially across said waste sludge tank between the end of the trough emptying into the waste sludge tank and the outlet to the pipe leading to said aeration tank, said baffle extending downwardly substantially below said inlet and outlet, but not to the bottom of the waste sludge tank.

6. In an apparatus for treating sewage, a waste sludge tank, a plurality of aeration tanks, a draft tube in each of said aeration tanks, means for drawing sewage from said aeration tanks upwardly through said draft tube, a diffuser cone adjacent the top of each of said draft tubes, said diffuser cone causing the sewage passing through said draft tubes to be splashed in all directions to become aerated, a clarification tank in each of said aeration tanks, each of said aeration tanks having an open top trough positioned above the top of the level of the liquid in said tanks, said troughs being in communication with said waste sludge tank and said troughs sloping towards said waste sludge tank so that sewage flowing therethrough will flow by gravity to said waste sludge tank, portions of said aerated sewage being deflected by said diffuser cones into said clarification tanks and into said troughs, a weir in said waste sludge tank and in each of said aeration tanks for controlling the liquid level in each of said tanks, the edge of the weir in the waste sludge tank over which the liquid from the waste sludge tank overflows being positioned at a higher level than the similar edges of the weirs in the aeration tanks, whereby the liquid level in said waste sludge tank is maintained at a level higher than the liquid level of any of the aeration tanks from which it is fed, outlet pipes leading from said waste sludge tank to each of said aeration tanks, said outlet pipes being in communication with the outlet from said weir in said waste sludge tank whereby the higher level in said waste sludge tank causes liquid to flow from said waste sludge tank to each of said aeration tanks.

PHILIP F. MORGAN.
JOHN A. TAPLESHAY.
PAUL M. THAYER.

REFERENCES CITED

The following references are of record in the file of this patent:

UNITED STATES PATENTS

| Number | Name | Date |
|---|---|---|
| 975,081 | Schilling | Nov. 8, 1910 |
| 2,067,161 | Durdin | Jan. 5, 1937 |
| 2,076,529 | Durdin | Apr. 13, 1937 |
| 2,090,384 | Durdin | Aug. 17, 1937 |
| 2,144,386 | Nordell | Jan. 17, 1939 |
| 2,186,371 | Durdin | Jan. 9, 1940 |
| 2,285,697 | Durdin | June 9, 1942 |
| 2,323,437 | Yeomans et al. | July 6, 1943 |
| 2,381,579 | Durdin | Aug. 7, 1945 |
| 2,419,693 | Short et al. | Apr. 29, 1947 |

FOREIGN PATENTS

| Number | Country | Date |
|---|---|---|
| 270,012 | Great Britain | May 4, 1927 |
| 365,263 | Great Britain | Jan. 21, 1932 |